June 16, 1931.　　　G. W. FELTON　　　1,809,965
CLUTCH OPERATING MECHANISM
Filed Feb. 10 1928　　2 Sheets-Sheet 1

INVENTOR
George W. Felton
BY
Kenyon & Kenyon
ATTORNEYS.

June 16, 1931.  G. W. FELTON  1,809,965
CLUTCH OPERATING MECHANISM
Filed Feb. 10 1928  2 Sheets-Sheet 2

INVENTOR
George W. Felton
BY
Kenyon & Kenyon
ATTORNEYS.

Patented June 16, 1931

1,809,965

UNITED STATES PATENT OFFICE

GEORGE W. FELTON, OF HAMILTON, NEW YORK, ASSIGNOR TO UTICA PRODUCTS, INC., OF UTICA, NEW YORK, A CORPORATION OF NEW YORK

CLUTCH OPERATING MECHANISM

Application filed February 10, 1928. Serial No. 253,272.

This invention relates to improvements in clutch operating mechanisms and more especially to a mechanism suitable for operating the clutch of a washing machine such as that disclosed in the copending application of George D. Hauser Ser. No. 244,805. In the machine disclosed in the said Hauser application there is provided a shiftable driving member which is moved into or out of engagement with either of two driven members. One of the driven members causes reciprocation of pounders for washing the clothes and the other of said driven members causes rotation of the clothes container for effecting drying of the clothes. The opposing faces of the driving and driven members are provided with inter-engaging teeth by means of which power is transmitted from the driving to the driven member.

An object of this invention is a new and improved mechanism for snapping the driving member while rotating into engagement with either of the driven members so that undue clashing of the teeth is prevented.

In one embodiment of the invention there is provided a pivoted clutch operating lever one end of which engages the shiftable driving member and the other end of which is connected to a hand lever through the medium of a resilient member. An impositive detent is provided for holding the clutch lever in neutral position with the driving member out of engagement with both of the driven members. Upon movement of the hand lever, the resilient member yields until the force exerted through it on the clutch lever overcomes the holding action of the detent. The lever then snaps into position to present the driving member in operative relation with one of the driven members. Because of the snap action, the teeth do not clash but are instantly engaged with each other. The engagement of the driving member with the driven member is independent of the manner of operation of the hand lever and is always accomplished in the same way. The life of the clutch members is thus prolonged as there is little or no wear on the clutch teeth.

Other objects, novel features and advantages of this invention will be apparent from the following specification and accompanying drawings, wherein Fig. 1 discloses a washing machine equipped with clutch operating mechanism embodying the invention.

Figure 1:
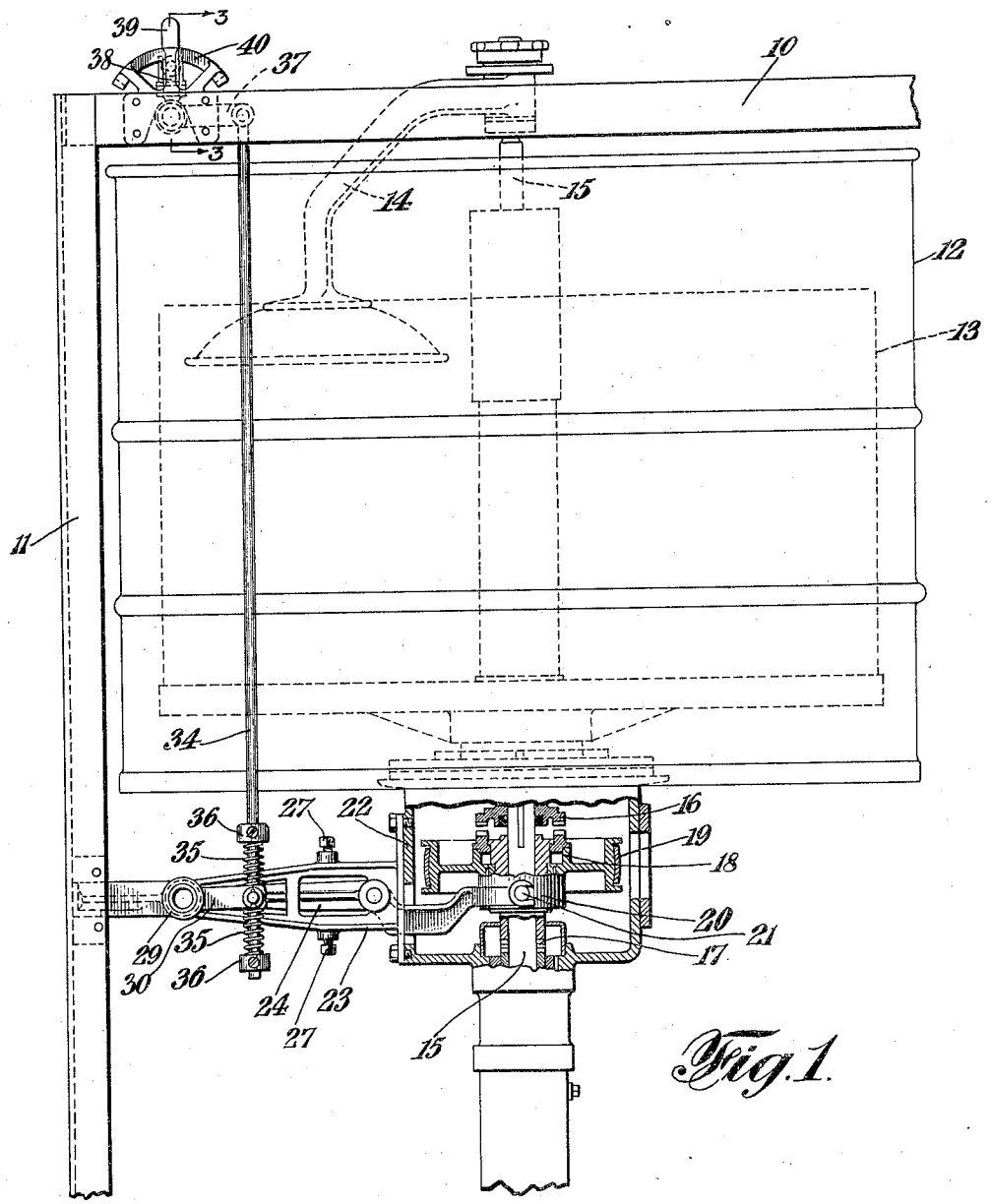
Figure 2:
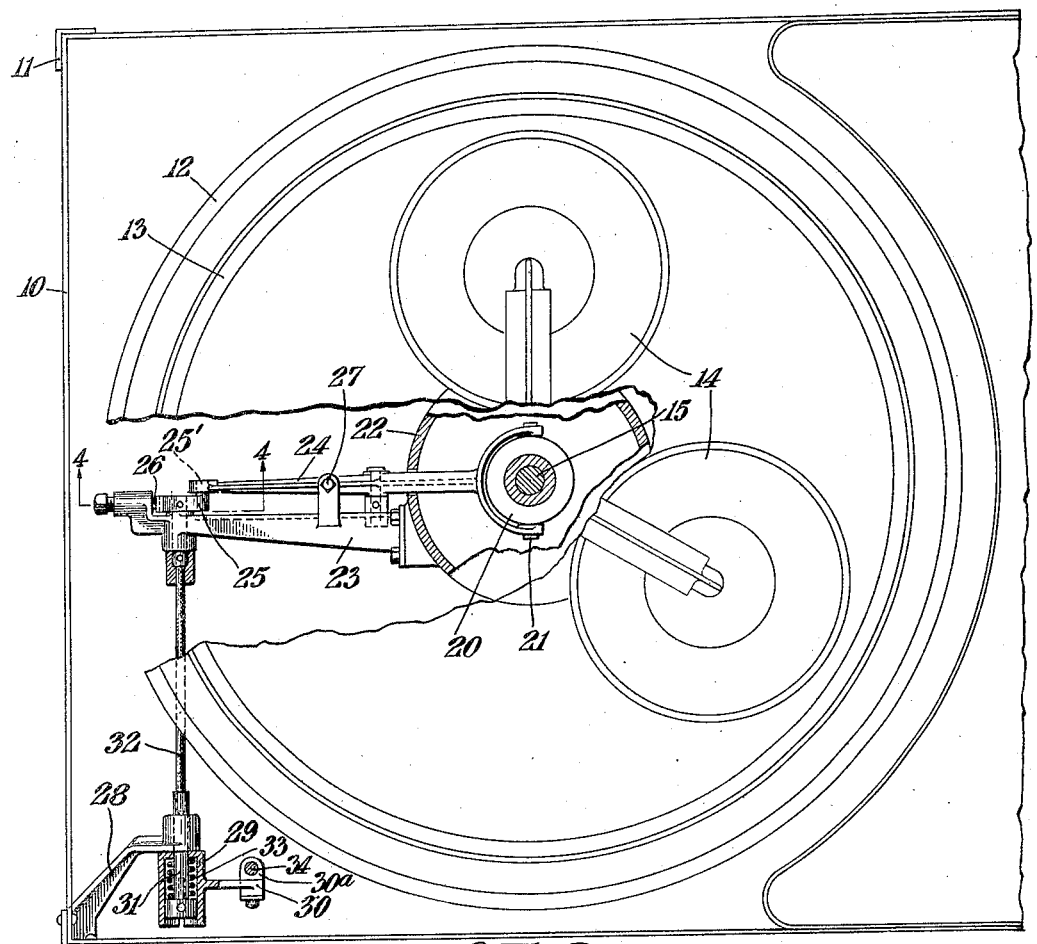
Fig. 2 is a plan view thereof partially broken away.
Figure 3:
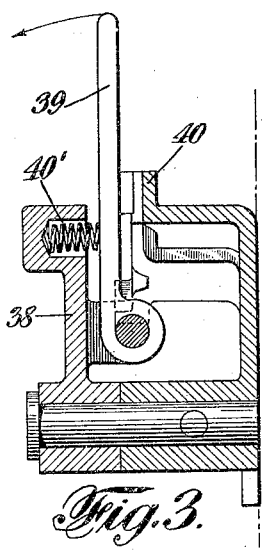
Fig. 3 is a section on the line 3—3 of Fig. 1.
Figure 4:
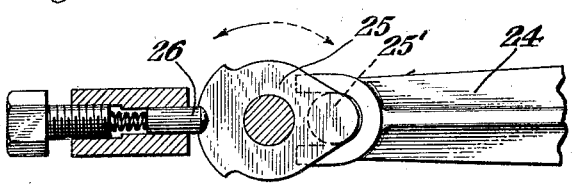
Fig. 4 is a section on the line 4—4 of Fig. 2.

The washing machine for use with which the clutch operating mechanism is particularly designed is disclosed in detail in the aforementioned Hauser application and is shown merely in outline here except such parts as are directly involved with this invention. The said washing machine comprises a cabinet of which 10 and 11 are frame members. 12 is the container within which is rotatably mounted the basket 13 and 14 designates the pounders which are carried by the reciprocating shaft 15. 16 is a clutch member rotatable with the basket 13 and 17 is a second rotatable clutch member by means of which reciprocation of the shaft 15 is effected. These two clutch members are fixed against axial movement and are co-axial with a clutch member 18 shiftable into or out of engagement with either of the other two clutch members. The member 18 is caused to rotate by means of a belt 19 and constitutes the driving member by means of which power is applied to either of the driven members 16 and 17. The shiftable member 18 has mounted thereon a collar 20 having trunnions 21. As before stated, this structure is described in detail in the Hauser application and the method of operation fully explained therein.

The clutch members are enclosed within a housing 22 to which is bolted a bracket 23. On this bracket is pivotally mounted a lever 24 having one end projecting into the casing 22 where it is operatively connected with the trunnions 21. Near the end of the bracket 23 is mounted a rotatable member 25 having an eccentric stud 25'. This stud is seated in a recess provided for that purpose at the end of the lever 24. The arrangement is such that rotary movement of the member 25 causes movement of the lever 24 to bring the shiftable clutch member 18 into engagement with either the clutch member 16 or the clutch member 17. The member 25 is provided with a recess to receive the end of a spring pressed plunger 26 mounted on the bracket 23 which plunger constitutes an impositive detent for holding the member 25 in such position that the clutch lever 24 is in neutral position. Bolts 27 are arranged to have their ends engage the lever 24 to limit the movement thereof.

A bracket 28 is supported by the frame of the washing machine at substantially the same level as the bracket 23. A second rotatable member 29 is supported by the bracket 28 and has an arm 30 integral therewith. The rotatable member 29 is tubular and has mounted therein a reciprocal member 31 which is connected by means of a flexible shaft 32 with the rotatable member 25. The reciprocal member 31 is slidably keyed to the rotatable member 29 and a spring 33 is interposed between the head of the reciprocal member 31 and the bottom of the recess in the rotatable member 29 to permit variation in length of the shaft 32. A rod 34 passes through an eyelet 30a mounted on the end of the arm 30 and is enclosed by two coil springs 35. Each spring 35 has one end engaging the eyelet 30a and the other end engaging a collar 36 on the rod 34. The upper end of the rod 34 is connected to one arm 37 of a bell crank lever, the other arm 38 of which has hand lever 39 pivotally mounted thereon. The lever 39 is adapted to seat in a notch in the segment 40, thus locking the same against movement. The notch is so placed that when the lever is locked the clutch member 18 is in neutral position. In order to swing the hand lever to operate the clutch it is first necessary to move the hand lever against the action of the spring 40' to disengage the same from its notch, after which it may be swung either to the right or to the left.

Assume that the shiftable clutch member 18 is in its neutral position and it is desired to engage the same with either the clutch member 16 or the clutch member 17. The operating handle 39 is in its middle position and the plunger 26 is seated in the notch in the rotatable member 25. The handle 39 is then actuated to move it out of its locking notch and swung either to the right or to the left. Assume for example that it is swung to the right. The rod 34 is caused to move downwardly by means of the bell crank lever, thereby compressing the spring 35 and applying a progressively increasing force against the arm 30. Through the rotating member 29 and the flexible shaft 32 a progressively increasing torque is applied to the rotating member 25. This member is prevented from moving by the spring pressed plunger 26. However, after the torque becomes sufficient to overcome the effect of the plunger 26, the member 25 is given a quick rotary movement in one direction. Such movement causes the lever 24 to swing on its pivot, thereby moving the shiftable member 18 into engagement with either the clutch member 16 or the clutch member 17. The shiftable member remains in this position until the hand lever 39 is again moved. Assume that it is returned to neutral position. The reverse operation above described will take place, bringing the shiftable member into neutral position and the spring pressed plunger will drop back into its socket again. Of course on the return movement there is no snap action as the spring pressed plunger 26 performs no function during the return.

The above described clutch operating mechanism causes instantaneous movement of the shiftable member into engagement with either of the others. Rubbing of the clutch members and clashing of the teeth is prevented and long life of the clutch members is insured. It is of course apparent that the invention is not limited to the particular embodiment above described and that various structural modifications may be made without in any way departing from the spirit of the invention as defined in the appended claims.

I claim:

1. A clutch operating mechanism comprising a pivoted lever, a rotatable member operatively connected with one end of said lever, impositive means for holding said lever in one position, a second rotatable member, a flexible shaft connecting said rotatable members, and means for applying progressively increasing torque to said second rotatable member.

2. A clutch operating mechanism comprising a pivoted lever, a rotatable member operatively connected with one end of said lever, impositive means for holding said lever in one position, a second rotatable member, a flexible shaft connecting said rotatable members, and resilient means for applying torque to said second rotatable member.

3. A clutch operating mechanism comprising a pivoted lever, a rotatable member operatively connected with one end of said lever, impositive means for holding said lever in one position, a second rotatable member, a flexible shaft connecting said rotatable members, an arm extending from said second rotatable member, a reciprocal member and resilient means connecting said arm and said reciprocal member.

4. A clutch operating mechanism comprising a pivoted lever, a rotatable member operatively connected with one end of said lever, impositive means for holding said lever in one position, a second rotatable member, a flexible shaft connecting said rotatable members, an arm extending from said second rotatable member, a reciprocal member extending through an aperture in one end of said arm, a pair of springs surrounding said reciprocal member, each spring having one end engaging said arm and means carried by said reciprocal member for engaging the other ends of said springs.

5. A clutch operating mechanism comprising a pivoted lever, a rotatable member operatively connected with one end of said lever, an impositive detent for holding said lever in one position, means for applying torque to said rotatable member, said means including an arm, a reciprocal member extending through said arm, a pair of springs surrounding said reciprocal member, each spring having one end engaging said arm and the other end connected to said reciprocal member and a hand lever for operating said reciprocal member.

6. A clutch operating mechanism comprising a pivoted lever, a rotatable member operatively connected with one end of said lever, an impositive detent for holding said lever in one position, means for applying torque to said rotatable member, said means including a second rotatable member, a flexible shaft connecting said rotatable members, a reciprocable member and a pair of springs connected at one end to said rotatable member and at the other end to said reciprocable member.

7. A clutch operating mechanism comprising a pivoted lever, a rotatable member operatively connected with one end of said lever, an impositive detent for holding said lever in one position, a second rotatable member, a flexible connection between said rotatable members, means for applying torque to said second rotatable member, said means including an arm, a reciprocal member extending through said arm, a pair of springs surrounding said reciprocal member, each spring having one end connected to said reciprocal member, and a hand lever for operating said reciprocal member.

In testimony whereof, I have signed my name to this specification.

GEORGE W. FELTON.